United States Statutory Invention Registration [19]

[11] Reg. Number: H626

Covino [43] Published: Apr. 4, 1989

[54] SOL-GEL CERAMIC OXIDES

[75] Inventor: Josephine Covino, Ridgecrest, Calif.

[73] Assignee: The United States of America as represented by the Secretary of the Navy, Washington, D.C.

[21] Appl. No.: 892,967

[22] Filed: Aug. 4, 1986

[51] Int. Cl.[4] ..... C03C 3/00

[52] U.S. Cl. ..... 501/12; 501/103; 501/108; 501/128; 501/133; 501/134; 501/153; 501/154

[58] Field of Search ..... 501/12, 128, 133, 154

[56] References Cited

U.S. PATENT DOCUMENTS

| | | | |
|---|---|---|---|
| 3,246,972 | 4/1966 | Smith | 65/18 |
| 3,597,252 | 8/1971 | Schroder et al. | 501/12 |
| 3,791,808 | 2/1974 | Thomas | 65/30 |
| 4,323,814 | 4/1982 | Matsuyama et al. | 65/32 |
| 4,397,666 | 8/1983 | Mishima et al. | 65/18.3 |

FOREIGN PATENT DOCUMENTS

| | | | |
|---|---|---|---|
| 3237140 | 4/1984 | Fed. Rep. of Germany | 501/12 |

OTHER PUBLICATIONS

Crawford, Jr.; "Defect Properties and Processing of High-Technology Nonmetallic Materials" Mat'ls Res. Soc. Symp. Proc., vol. 24, 1983, pp. 291-297.

Bulent Yoldas; Formulations and Modification of Oxide Networks by Chemical Polymerization; 1984; pp. 291-297.

C. J. Brinker; Sol-Gel Transition in Simple Silicates: 1983; Report No. DE83013975.

*Primary Examiner*—John F. Terapane
*Assistant Examiner*—John M. Covert
*Attorney, Agent, or Firm*—William C. Townsend; Melvin J Sliwka

[57] ABSTRACT

A method of synthesizing ceramic oxides using the Sol-Gel process to control particle size distribution, crystal structure and to achieve the selective incorporation of transition metals within a ceramic oxide matrix in order to produce tailored oxides with specific particle morphology and near zero expansion optical ceramics.

15 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

β-QUARTZ LITHIUM ALUMINUM SILICATE
DISTRIBUTION GRAPH (by volume)

β-QUARTZ LITHIUM ALUMINUM SILICATE with PHOSPHORUS
DISTRIBUTION GRAPH (by volume)

SOL-GEL CERAMIC OXIDES

BACKGROUND OF THE INVENTION

1. Field of the Invention

This invention relates to the synthesis of ceramic oxides using the sol-gel process and, more particularly, to the synthesis of ceramic oxides having transition metals selectively incorporated within a ceramic oxide matrix. Still more particularly, this invention relates to the control of ceramic oxide particle size and crystallinity during synthesis to achieve specific physical properties in order to produce tailored oxides with specific particle morphology and near zero expansion optical ceramics.

2. Description of the Prior Art

The sol-gel process is a well-known technique for preparing metal oxides by the hydrolysis of a metal-organic compound to form a sol. The very small particles of colloidal metal oxides in the sol gather together into clusters or masses until they become large enough and sufficiently immobile to produce first a viscous liquid and then a solid colloidal gel structure. This technique has been applied not only to the preparation of single component oxide glasses, but also to the preparation of multicomponent oxide glasses.

In the Sol-Gel technique, it is also known that growth of metal oxide chains and networks can be achieved which eventually lead to gelation. Properties of gels produced in this manner are fundamentally different from gels produced in colloidal systems. Control of chemical polymerization, such as the acid and base catalyzed hydrolysis of tetraethylorthosilicate in alcoholic solutions, allows control of the form of the resulting polymer. It is known that the form of the resulting polymers in the tetraethylorthosilicate system is governed by the relative rates of reactions of hydrolysis and condensation. Undesirable colloidal solutions are formed in the tetraethylorthosilicate system when hydrolysis is rapid compared to condensation.

The prior art teaches the production of simple binary glasses such as Si and Ti or Zr oxides from alkoxide solutions. A gelling agent added to the solution increases the viscosity so that shaping or application of the solution on other surfaces can occur independently of the progress of hydrolysis of the alkoxide in the solution. The use of acid or base catalysts to achieve polymer growth and resulting gelation without formation of colloidal silica is not discussed. Other references also disclose methods for producing ceramic articles and glass compositions using the Sol-Gel techniques; however, none disclose using Sol-Gel techniques to control hydrolysis and polymerization to synthesize materials with a specific particle size distribution and crystal structure in order to achieve specific physical properties such as a low thermal expansion coefficient.

One reference does teach the use of an "effective catalytic amount of an acid hydrolysis catalyst." This amount is disclosed as the range of 1 to about 500 parts by weight (of acid) per million parts by weight of the silicon alkoxide. An acid catalyst concentration of 500 parts per million or less is not adequate to provide the advantage from lowering the PH of the solution in order to form oxide networks and chains which eventually lead to gelation without the formation of colloidal silica.

Liquid silica sols and silica gels are used as starting materials in processes other than the Sol-Gel process for the production of ceramics and glasses. The prior art teaches the preparation of a glass like material with a three-dimensional inorganic network of Si—O, B—O, Sn—O or P—O polyhedra or their mixtures and bound organic residues. The networks are the result of polycondensation of mono-organic silicic acids in aqueous alcoholic solutions. Acid or base catalysts are not used. Control of polymer growth and properties by control of hydrolysis and condensation reactions is not disclosed. The resulting materials combine the properties of glass and plastics, depending on the properties of the organic residues.

There is a need for new oxide glass-ceramics with ultra-low expansivity, low helium permeability and thermal stability over an extended temperature range for applications in optics, electronics and ultra-precision measuring equipment. An example of materials with these characteristics are Lithium aluminum silicate (LAS) glass-ceramics with the stable beta-quartz crystal structure. There are applications where available Lithium Aluminum Silicate glass-ceramics (LAS) such as Corning Glass Works' ULE (type 7971) or Schott's Zerodur are not acceptable. For example, ULE has a high helium permeability and cannot be used for ultra-precision measuring equipment. Because Zerodur has some small instability on thermal cycling near −28° C. and −177° C., which are in the operational temperature range of ultra-precision measurement, it cannot be used for all ultra-precision measurement equipment. Furthermore, the few remaining obtainable LAS glass-ceramic systems are not of a reproducibly acceptable quality and are not easily available. The present invention results from efforts to use the sol-gel process to synthesize materials with specific particle distributions and crystal structures to give specific physical properties such as a low thermal expansion coefficient. sol-Gel synthesis of beta-quartz lithium aluminum silicates and gamma-quartz lithium aluminum silicates have been performed and the material properties have been determined.

SUMMARY OF THE INVENTION

Lithium Aluminum Silicate (LAS) glass-ceramic compositions with the beta-LAS and gamma-LAS structure and specific particle size distributions have been synthesized using the Sol-Gel technique. In the method of the present invention, transition metal alkoxides or other hydrolyzable metal organics are dissolved in an acid pH-controlled organic solvent. Water is then added to this solution to produce three-dimensionally cross-linked polymers having a controlled cross-linked matrix formed during hydrolysis and condensation reactions. The resulting gel is dried under controlled heat and mechanically processed resulting in transition metal oxides having an net coefficient of expansion approaching zero.

One embodiment of the invention requires the pretreatment of the sol by sonication. This step results in an oxide product having the gamma-$Al_2O_3$ structure. Previously, this structure was only obtained by heat treatment of the oxide at high temperatures.

By controling chemical polymerization in the Sol-Gel Process one can control particle sizes of the oxides as well as the connectivity with a variety of metal oxides. The sol-gel process can also allow incorporation of oxides that have a negative expansion coefficient with oxides that have a positive expansion coefficient so as to have the net effect of a near zero expansion coefficient.

OBJECTS OF THE INVENTION

An object of this invention is an improved method for producing transition metal ceramic oxides by the Sol-Gel hydrolysis of hydrolyzable metal-organics.

Another object of this invention is a method for controlling particle size distribution and crystal structure using Sol-Gel synthetic techniques in order to produce tailored oxides with specific particle morphology and near zero expansion optical ceramics.

A further object of this invention is the preparation of oxide glass-ceramics with ultra-low expansivity, low helium permeability and thermal stability over an extended temperature range for application in ultra-precision measurement equipment.

DETAILED DESCRIPTION OF THE INVENTION

Figure 1:
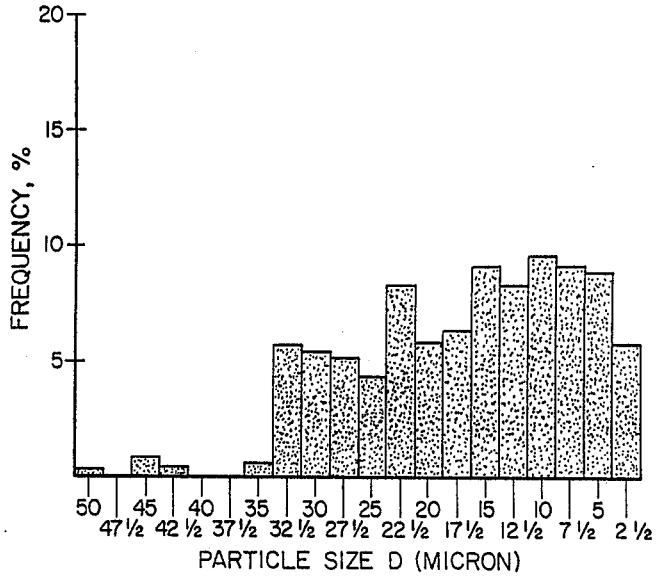
FIG. 1 is a graph showing the particle size distribution by volume for the beta-quartz Lithium Aluminum Silicate composition of one example of the present invention.

The Sol-Gel technique involves the formation of a sol via a hydrolysis reaction of certain metal-organic compounds. In the sol, partially polymerized material is formed. Chemical polymerization under controlled conditions via hydrolytic polycondensation eventually leads to gelation without the formation of colloidal silica.

The method of the present invention uses Sol-Gel synthetic techniques to tailor the expansion coefficient of a mixture of oxides by control of particle size of the oxides, control of connectivity with a variety of metal oxides, and incorporation of oxides with a negative expansion coefficient.

Molecular-structural variations can be introduced into the inorganic network of metal-organic derived polymer gels. These structural variations in the inorganic network modify the behavior and properties of the resulting materials. Unusual structural conditions often result from the Sol-Gel technique because the synthesis begins with an organic compound of the metal and ends up with an oxide structure of that metal without going through high temperatures.

The present invention uses an acid catalyst to achieve growth of metal oxide chains and networks through hydrolysis and condensation reactions without the formation of colloidal silica. This controlled polymerization produces a three-dimensionally cross-linked ceramic oxide matrix. Unusual structural conditions resulting from the formation of oxides from metal-organic compounds allow incorporation of metal oxides with different crystal structures into the matrix. These mixed metal-oxides are dispersed uniformly throughout the sol and are connected up by hydrolytic polycondensation. The resulting matrix has a low coefficient of expansion because these crystal structures match with other crystal structures having different shapes in a manner that produces a ceramic oxide matrix which is finely knit together and relatively dense. X-ray diffractometer analysis of ceramic oxides prepared by this method of the present invention show the same virgilite structure as commercially available beta-quartz LAS glass-ceramic materials.

In the embodiment where the sol is sonicated, the Sol-Gel process yields a crystal structure which is usually achieved only through heat treatment of the oxide product at high temperatures. Analysis of ceramic oxides prepared from aluminum propionate which was sonicated while still a Sol-Gel mixture shows the gamma-$Al_2O_3$ structure. It is believed that sonication of the aluminum propionate [$Al(CO_2CH_2CH_3)_3$] solution has the effect of breaking up the metal-organic groups and inducing the polymerization of Al-O units.

The general method of the present invention to form ceramic oxides having a specific particle size distribution and crystal structure has several steps.

First, a hydrolyzable transition metal organic compound is dissolved in an acid pH-controlled organic solvent. It may be necessary to form several separate solutions which are later combined into a single solution. Alkoxides of metals such as aluminum and titanium can be use with tetraethoxysilane solvent. The pentanedionates of metals such as lithium, zirconium, magnesium and zinc may be used instead of the alkoxides. The metal pentanedionates are dissolved in an alcohol instead of tetraethoxysilane. After all the solutions are combined into a single mixture, additional alcohol may be necessary to achieve the proper consistency. At this point, the pH is adjusted with an acid to the range between 3 and 4.

In the embodiment using metal propionates, the Sol-Gel solution is sonicated and left to gel. In the embodiment using the other metal organic compounds a small amount of water is added to the metal organic solution in the acid PH-controlled organic solvent in order to initiate polymerization by hydrolytic polycondensation. During this state, glass-like macro-molecules, containing network forming cations linked by bridging oxygen, are formed in solution at low temperatures. Then, after adding the stoichiometric amount of water to complete the hydrolysis, this chemical polymerization process proceeds and subsequently increases the solution's concentration until it is transformed to a stiff, amorphous mass referred to as a "gel."

The gel to powder conversion starts by slowly drying this gel in air, thereby disintegrating it into smaller chunks. Further de-agglomeration of these chunks is accelerated by exposure to a heat lamp. The heat lamp enhances removal of solvents and water until the material becomes a coarse powder. The material is then calcined at temperatures of 600° C. and 800° C. Manual or mechanical pulverization is then used to form a powder. The crystal structure is then characterized by X-ray powder diffraction.

The following examples are given to illustrate but not limit the invention:

EXAMPLE 1

A thermally crystallizable oxide product having a poorly defined beta-quartz or virgilite structure before calcining and a well defined virgilite structure after calcining was prepared as follows:

About 135.1 grams of aluminum butoxide [$Al(OC_4H_9)_3$] precursor was dissolved into 212.8 grams of tetraethoxysilane [$(C_2H_5O)_4Si$] precursor. About 8.2 grams of titanium isopropoxide [$Ti(OC_3H_7)_4$] was then separately dissolved into a small amount of tetraethoxysilane [$(C_2H_5O)_4Si$] solvent. Both liquid mixtures were then further diluted with isopropyl alcohol (IPA) and combined into mixture hereinafter referred to as the "prime mixture". Separately, a mixture of about 7.5 grams of zirconium 2,4-pentanedionate [$Zr(O_2C_5H_7)$], 6.4 grams of magnesium 2,4-pentanedionate [$Mg(O_2C_5H_7)$], and 4.9 grams of zinc 2,4-pentanedionate [$Zn(O_2C_5H_7)$] precursors was dissolved in isopropyl alcohol. This solution was then added to the prime mixture. About 29.0 grams of lithium 2,4-pentanedionate [$Li(O_2C_5H_7)$] was dissolved in methanol and then added to the prime mixture. At this point, the prime mixture may be diluted with isopropyl alcohol. Next, the pH was lowered with nitric acid ($HNO_3$) to the range between 3 and 4. The mixture was maintained at room temperature. Hydrolytic polycondensation was initiated by the addition of a small amount of water. An additional amount of water sufficient to maintain the hydrolysis reaction was then added. Chemical polymerization proceeded until the solution was transformed into a stiff, amorphous mass referred to as a "gel."

Gel to powder conversion starts by slowly drying this gel in air, thereby disintegrating it into smaller chunks. Further de-agglomeration of these chunks was accelerated by exposure to a heat lamp. The material was then calcined at temperatures of 600° C. and 800° C. Manual or mechanical pulverization was then used to make the powder approximately 100 to 200 mesh size. The crystal structure was then characterized by X-ray powder diffraction. Samples before calcining are poorly crystalline while samples after calcining have a powder pattern which can be indexed as the virgilite structure. This structure is a stuffed disordered beta-quartz structure.

Particle size determination was performed by three different methods. The particle size distribution from 50 to 260 microns was determined by sieving. The distribution for particles of 50 microns or smaller was determined with the Horiba-CaPa 500 particle analyzer. Scanning electron micrographs confirmed that the samples have a variety of particle sizes and shapes. About 72% of the particles were larger than 50 microns. Elemental compositions of the Lithium Aluminum Silicate-like material (NZ) showed 28.49% silicon, 14.7% aluminum, 1.89% lithium, 1.24% zinc, 0.66% magnesium, 1.52% titanium and 1.55% zirconium. The balance of the formulation was oxygen.

EXAMPLE 2

The procdedure of Example 1 is used to prepare Lithium Aluminum Silicate glass-ceramic compositions containing phosphorus. The only difference in procedure is that the titanium isoproyoxide [$Ti(OC_3H_7)_4$] is dissolved into tributyl phosphate [$(C_4H_9)_3PO_4$] instead of tetraethoxysilane [$(C_2H_5O)_4Si$] solvent.

About 123.7 grams of aluminum butoxide [$Al(OC_4H_9)_3$] precursor was dissolved into 194.6 grams of tetraethoxysilane [$(C_2H_5O)_4Si$] precursor. About 8.2 grams of titanium isopropoxide [$Ti(OC_3H_7)_3$] was then dissolved into about 30.0 grams of tributyl phosphate [$(C_4H_9)_3PO_4$] solvent. Both liquid mixtures were then further diluted with isopropyl alcohol (IPA) and combined into mixture hereinafter referred to as the "prime mixture". Separately, a mixture of about 7.5 grams of zirconium 2,4-pentanedionate [$Zr(O_2C_5H_7)$], 6.4 grams of magnesium 2,4-pentanedionate [$Mg(O_2C_5H_7)$], and 4.9 grams of zinc 2,4-pentanedionate [$Zn(O_2C_5H_7)$] precursors was dissolved in isopropyl alcohol. This solution was then added to the prime mixture. About 26.3 grams of lithium 2,4-pentanedionate [$Li(O_2C_5H_7)$] was dissolved in methanol and then added to the prime mixture. At this point, the prime mixture may be diluted with isopropyl alcohol. Next, the pH was lowered with nitric acid ($HNO_3$) to the range between 3 and 4. The mixture was maintained at room temperature. Hydrolytic polycondensation was initiated by the addition of a small amount of water. An additional amount of water sufficient to maintain the hydrolysis reaction was then added. Chemical polymerization proceeded until the solution was transformed into a stiff, amorphous mass referred to as a "gel."

Gel to powder conversion and calcining steps were the same as in Example 1. The crystal structure was then characterized by X-ray powder diffraction and showed the stuffed disordered beta-quartz structure as the oxide product of Example 1. Particle size determination followed the same procedure as in Example 1. About 50% of the particles were larger than 50 microns. Elemental composition of the Lithium Aluminum Silicate-like material with phosphorus (NZP) showed 26.22% silicon, 13.55% aluminum, 3.49% phosphorus, 1.72% lithium, 1.13% zinc, 0.6% magnesium, 1.38% titanium and 1.4% zirconium. The balance of the formulation was oxygen.

Figure 2:
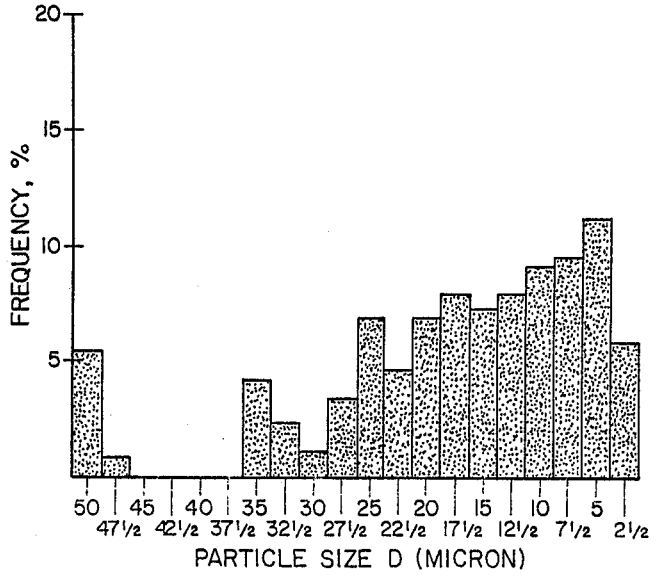
FIG. 2 is a graph showing the particle size distribution by volume for the beta-quartz Lithium Aluminum Silicate composition with phosphorus in another example of the present invention.

Table 1 shows comparisons by weight percent of the nitric acid pH-adjusted Lithium Aluminum Silicate-like material (NZ) and nitric acid pH-adjusted Lithium Aluminum Silicate-like material with phosphorus (NZP) with a nominal Lithium Aluminum Silicate (LAS) glass-ceramic composition. Tables 2 and 3 show the particle size, distribution by volume of the NZ and NZF Sol-Gel produced powders, respectively. FIGS. 1 and 2 graphically represent the particle size distribution for the NZ and NZP Sol-Gel produced powders.

EXAMPLE 3

A thermally crystallizable oxide product having a gamma-$Al_2C_3$ structure was prepared as follows:

One gram of aluminum propionate [$Al(CO_2CH_2CH_3)_3$] was mixed with 26 ml of distilled water. 200 drops of concentrated HCl was added to this mixture. About 10 ml of methanol was also added and a pH of 0.7 was measured. This solution was sonicated at 4.4 amp D.C. for 10 minutes. The temperature of the solution ranged from 34° C. to 60° C. during the sonication process. This solution was left to gel for several days. The sample never gelled but crystallization took place and the product was dried to a powder.

X-ray powder diffraction showed a crystalline powder which can be indexed as the gamma-$Al_2O_3$ form.

Obviously many modifications and variations of the present invention are possible in light of the above teachings. It is therefore to be understood that within the scope of the appended claims the invention may be practiced otherwise than as specifically described.

TABLE 1

Compositions of Nominal LAS Glass-Ceramic as Compared to Synthetic Sol-Gel-Derived NZ and NZP.

| Constituents | Nominal LAS | NZ | NZP |
|---|---|---|---|
| Silicon dioxide ($SiO_2$) | 55.50 | 61.35 | 56.10 |
| Aluminum oxide ($Al_2O_3$) | 25.30 | 27.97 | 25.60 |
| Lithium oxide ($Li_2O$) | 3.70 | 4.08 | 3.70 |
| Titanium dioxide ($TiO_2$) | 2.30 | 2.30 | 2.30 |
| Magnesium oxide (MgO) | 1.00 | 1.00 | 1.00 |
| Zirconium dioxide ($ZrO_2$) | 1.90 | 1.90 | 1.90 |
| Zinc oxide (ZnO) | 1.40 | 1.40 | 1.40 |
| Phosphorous pentoxide ($P_2O_5$) | 7.90 | — | 8.00 |
| Miscellaneous oxides (arsenic, iron, potassium, | 1.01 | — | — |

TABLE 1-continued

| Compositions of Nominal LAS Glass-Ceramic as Compared to Synthetic Sol-Gel-Derived NZ and NZP. | | | |
|---|---|---|---|
| Constituents | Nominal LAS | NZ | NZP |
| calcium, and sodium) | | | |

TABLE 2

| DISTRIBUTION TABLE (BY VOL) | | | |
|---|---|---|---|
| | D (MICRON) | F (%) | R (%) |
| Particle | 50.0–47½ | 0.2 | 0.2 |
| Size Dis- | 47½–45.0 | 0.0 | 0.2 |
| tribution | 45.0–42½ | 1.5 | 1.7 |
| by Volume | 42½–40.0 | 0.6 | 2.3 |
| Obtained | 40.0–37½ | 0.0 | 2.3 |
| with the | 37½–35.0 | 0.0 | 2.3 |
| Capa-500 | 35.0–32½ | 1.7 | 4.0 |
| Analyzer | 32½–30.0 | 5.9 | 9.9 |
| From −300 | 30.0–27½ | 5.6 | 15.5 |
| Mesh (50 | 27½–25.0 | 5.5 | 21.0 |
| Microns) | 25.0–22½ | 4.5 | 25.5 |
| and | 22½–20.0 | 8.7 | 34.2 |
| Smaller | 20.0–17½ | 6.2 | 40.4 |
| of the NZ | 17½–15.0 | 6.6 | 47.0 |
| Sol-Gel- | 15.0–12½ | 9.1 | 56.1 |
| Produced | 12½–10.0 | 8.8 | 64.9 |
| Powder. | 10.0–7½ | 9.9 | 74.8 |
| | 7½–5.0 | 9.6 | 84.4 |
| | 5.0–2½ | 9.4 | 9.38 |
| | 2½–0.0 | 6.2 | 100.0 |

$D_{average}$ = 14.17 MICRON

TABLE 3

| DISTRIBUTION TABLE (BY VOL) | | | |
|---|---|---|---|
| | D (MICRON) | F (%) | R (%) |
| Particle | 50.0–47½ | 5.4 | 5.4 |
| Size Dis- | 47½–45.0 | 0.8 | 6.1 |
| tribution | 45.0–42½ | 0.0 | 6.1 |
| by Volume | 42½–40.0 | 0.0 | 6.1 |
| Obtained | 40.0–37½ | 0.0 | 6.1 |
| with the | 35.0–32½ | 4.5 | 10.6 |
| Capa-500 | 32½–30.0 | 2.4 | 13.0 |
| Analyzer | 30.0–27½ | 1.1 | 14.1 |
| From −300 | 27½–25.0 | 3.3 | 17.4 |
| Mesh (50 | 25.0–22½ | 7.3 | 24.7 |
| Microns) | 22½–20.0 | 4.8 | 29.5 |
| and | 20.0–17½ | 7.3 | 36.8 |
| Smaller | 17½–15.0 | 8.4 | 45.2 |
| of the NZP | 15.0–12½ | 7.8 | 53.0 |
| Sol-Gel- | 12½–10.0 | 8.7 | 61.7 |
| Produced | 10.0–7½ | 9.7 | 71.4 |
| Powder. | 7½–5.0 | 10.0 | 81.4 |
| | 5.0–2½ | 12.2 | 93.6 |
| | 2½–0.0 | 6.4 | 100.0 |

$D_{average}$ = 13.48 MICRON

What is claimed is:

1. A method for selectively incorporating transition metals within a ceramic oxide matrix and for producing a ceramic oxide product having a particular particle size distribution and crystal structure, said method comprising the steps of:

forming a solution of hydrolyzable transition metal organic compounds in an organic solvent;

lowering the pH of said solution with an acid to a range that allows growth of metal oxide chains and networks through hydrolysis and condensation reactions without the formation of colloidal silica;

initiating a hydrolytic polycondensation reaction in said solution by adding water to produce a gel containing three-dimensionally cross-linked polymers having a controlled cross-linked matrix; and heating said gel so as to substantially remove organic and free liquid components and convert said gel to a particulate oxide product.

2. The method of claim 1 wherein said hydrolyzable transition metal organic compounds contain transition metals selected from the group consisting of aluminum, titanium, zirconium, magnesium, zinc and lithium.

3. The method of claim 2 wherein said hydrolyzable transition metal organic compounds are selected from the group consisting of aluminum butoxide, titanium isopropoxide, zirconium 2,4-pentanedionate, magnesium 2,4-pentanedionate, zinc 2,4-pentanedionate, and lithium 2,4-pentanedionate.

4. The method of claim 1 wherein said organic solvent or mixture of solvents is selected from the group consisting of tetraethoxysilane, isopropyl alcohol, methanol and tributyl phosphate.

5. The method of claim 1 wherein said acid adjusted pH range is between the pH values of 3 and 4.

6. The method of claim 5 wherein said acid is a mineral acid selected from the group consisting of nitric acid and hydrochloric acid.

7. The method of claim 1 wherein said oxide product is a composition corresponding to a lithium aluminum silicate composition having the beta-quartz structure.

8. The method of claim 7 wherein said beta-quartz lithium aluminum silicate has a coefficient of thermal expansion near zero.

9. A method of producing an aluminum oxide product having the gamma-$Al_2O_3$ structure comprising the steps of:

forming a solution of aluminum propionate and distilled water;

adding concentrated hydrochloric acid to said solution to lower the pH of said solution to about 0.7;

adding methanol to dilute said solution;

sonicating said solution for about ten minutes; and dehydrating said solution to recover a crystalline ceramic oxide powder.

10. In the method of preparing a desired ceramic oxide product by forming metal oxide chain and network structures by hydrolysis and polymerization of a solution of at least one metal-organic compound followed by drying the solution to recover the product where the product is determined by controlling said structure by selection of the pH of the solution and by selective dilution of the solution, the improvement comprising further control of said structure by sonication of the solution.

11. The method of claim 10 wherein the desired product is aluminum oxide having the gamma structure; wherein the solution is an aqueous solution of aluminum propionate; wherein said selection of the pH of the solution is by the addition of hydrochloric acid to give a pH of about 0.7 and said dilution is by methanol; and wherein the solution is sonicated for about ten minutes with the solution at a temperature in the range of about 34° C. to about 60° C.

12. A method for producing a lithium aluminum silicate-like ceramic oxide product incorporating desired metal oxides, the method comprising:

forming a solution in an organic solvent of hydrolyzable organic compounds of said metals;

adding sufficient water to said solution to initiate and to maintain hydrolysis of said compounds and growth of metal oxide chains and networks in the solution by polymerization; and selecting the pH of said solution so that said hydrolysis and polymerization proceeds without the formation of colloidal oxides which detach from said chains and networks but are desired to remain therein to form said product.

13. The method of claim 12 wherein said oxides include oxides of aluminum, titanium, zirconium, magnesium, zinc, and lithium having as respective precursors dissolved in said solution, aluminum butoxide, titanium isopropoxide, zirconium 2,4-pentanedionate, magnesium 2,4-pentanedionate, zinc 2,4-pentanedionate, and lithium 2,4-pentanedionate with tetraethoxysilane, isopropyl alcohol, and methanol as solvents, and wherein during hydrolysis and polymerization the temperature of said solution is maintained at substantially room temperature and the pH of said solution is selected in the range of about 3 to about 4 so that silica in colloidal form does not detach from said chains and networks and so that the product has the beta quartz structure.

14. The method of claim 13 wherein, to form said solution, the aluminum butoxide and the titanium isopropoxide are dissolved is said tetraethoxysilane; the zirconium, magnesium, and the zinc 2,4-pentanedionates are dissolved in said isopropyl alcohol; and the lithium 2,4-pentanedionate to be dissolved in methanol.

15. The method of claim 13 wherein, to form said solution, the aluminum butoxide is dissolved in said tetraethoxysilane; the zirconium, magnesium, and zinc 2,4-pentanedionates are dissolved in said isopropyl alcohol; and the lithium 2,4-pentanedionates is dissolved in methanol, and wherein the product further includes phosphorus having as a precursor tributyl phosphate utilized is said solution as a solvent for the titanium isoproxide.

* * * * *